United States Patent [19]
Borders et al.

[11] Patent Number: 5,860,708
[45] Date of Patent: Jan. 19, 1999

[54] CONTAMINANT EXCLUDING HUBCAP VENT PLUG

[75] Inventors: Daylen D. Borders; Paul S. Perry, both of Longview, Tex.

[73] Assignee: Stemco Inc, Longview, Tex.

[21] Appl. No.: 891,477

[22] Filed: Jul. 11, 1997

[51] Int. Cl.$^6$ ....................................................... B60B 7/00
[52] U.S. Cl. ..................................... 301/108.1; 301/108.4
[58] Field of Search ............................. 301/37.1, 37.37, 301/108.1, 108.2, 108.3, 108.4, 108.5

[56] References Cited

U.S. PATENT DOCUMENTS

| | | | |
|---|---|---|---|
| 3,064,982 | 11/1962 | Stephens . | |
| 3,114,579 | 12/1963 | Isenbarger . | |
| 3,915,266 | 10/1975 | Lante ................................ | 301/108.1 X |
| 4,073,540 | 2/1978 | Jackowski . | |
| 5,192,117 | 3/1993 | Kuck . | |
| 5,303,800 | 4/1994 | Persson ............................. | 301/108.1 X |
| 5,482,358 | 1/1996 | Kuck . | |
| 5,492,393 | 2/1996 | Peisker et al. . | |
| 5,505,525 | 4/1996 | Denton ............................. | 301/108.2 X |
| 5,752,746 | 5/1998 | Perry ................................... | 301/108.1 |
| 5,785,390 | 7/1998 | Gold et al. ........................ | 301/108.1 |

*Primary Examiner*—Russell D. Stormer
*Attorney, Agent, or Firm*—Cummings & Lockwood

[57] ABSTRACT

A hubcap vent plug is disclosed which includes a plug body having inlet vent structure for accommodating air flow into a bearing chamber during wheel end pressurization, outlet vent structure for accommodating gaseous flow out of the bearing chamber during wheel end depressurization, a first one-way check valve operatively associated with the inlet vent structure, a second one-way check valve operatively associated with the outlet vent structure, and an annular seal member mounted on the plug body for sealingly engaging the periphery of a reception port formed the end wall of the hubcap.

20 Claims, 5 Drawing Sheets

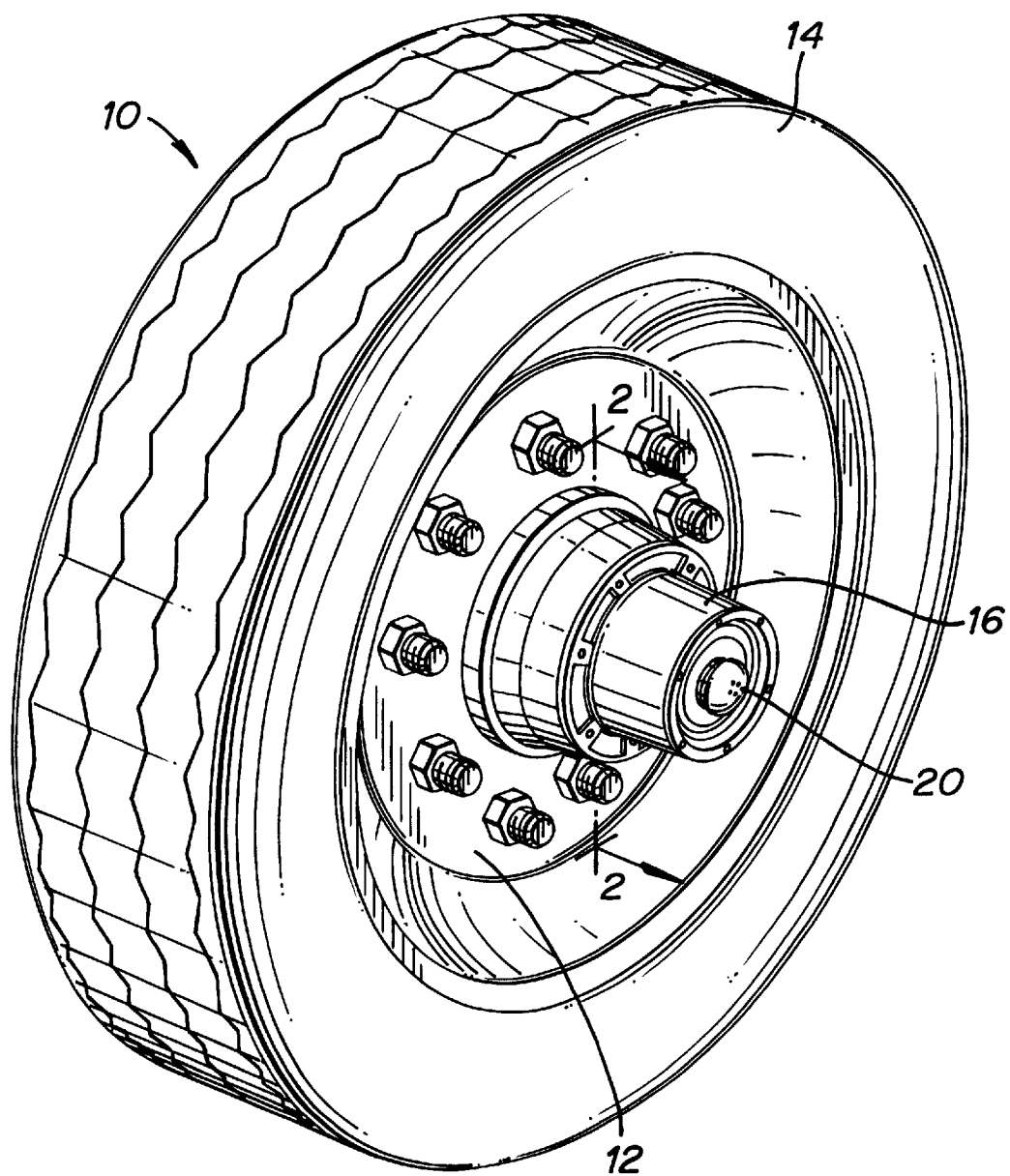
FIG_1

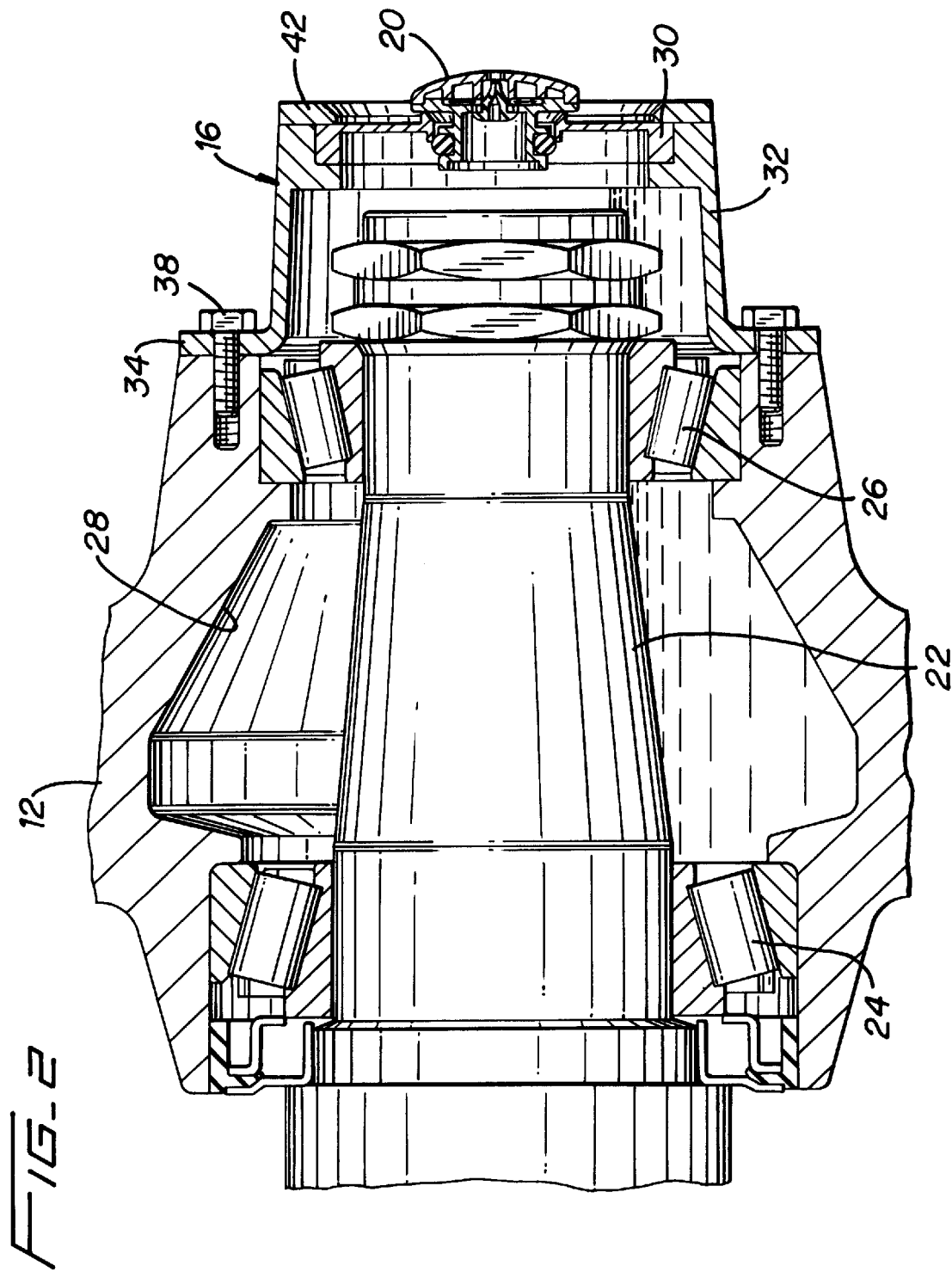

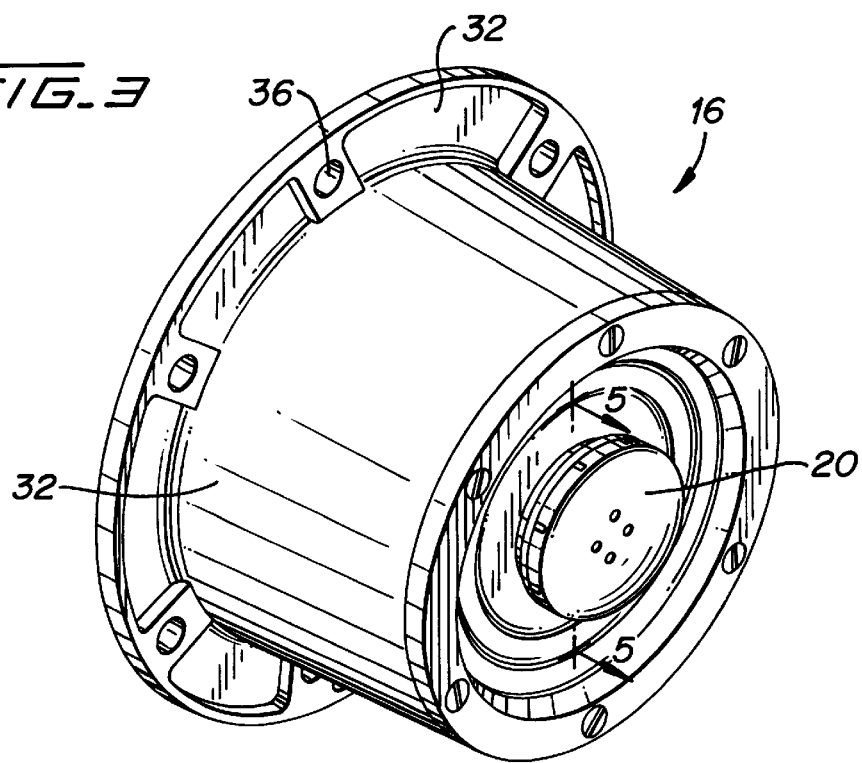
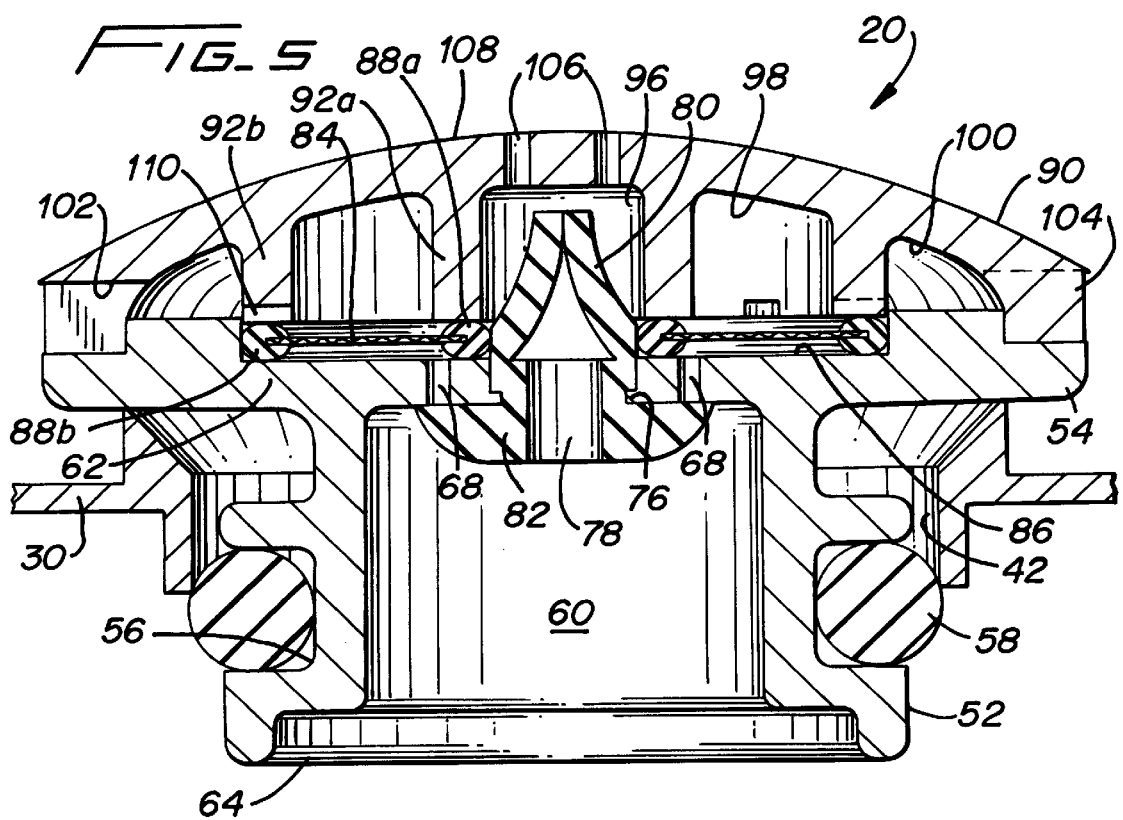

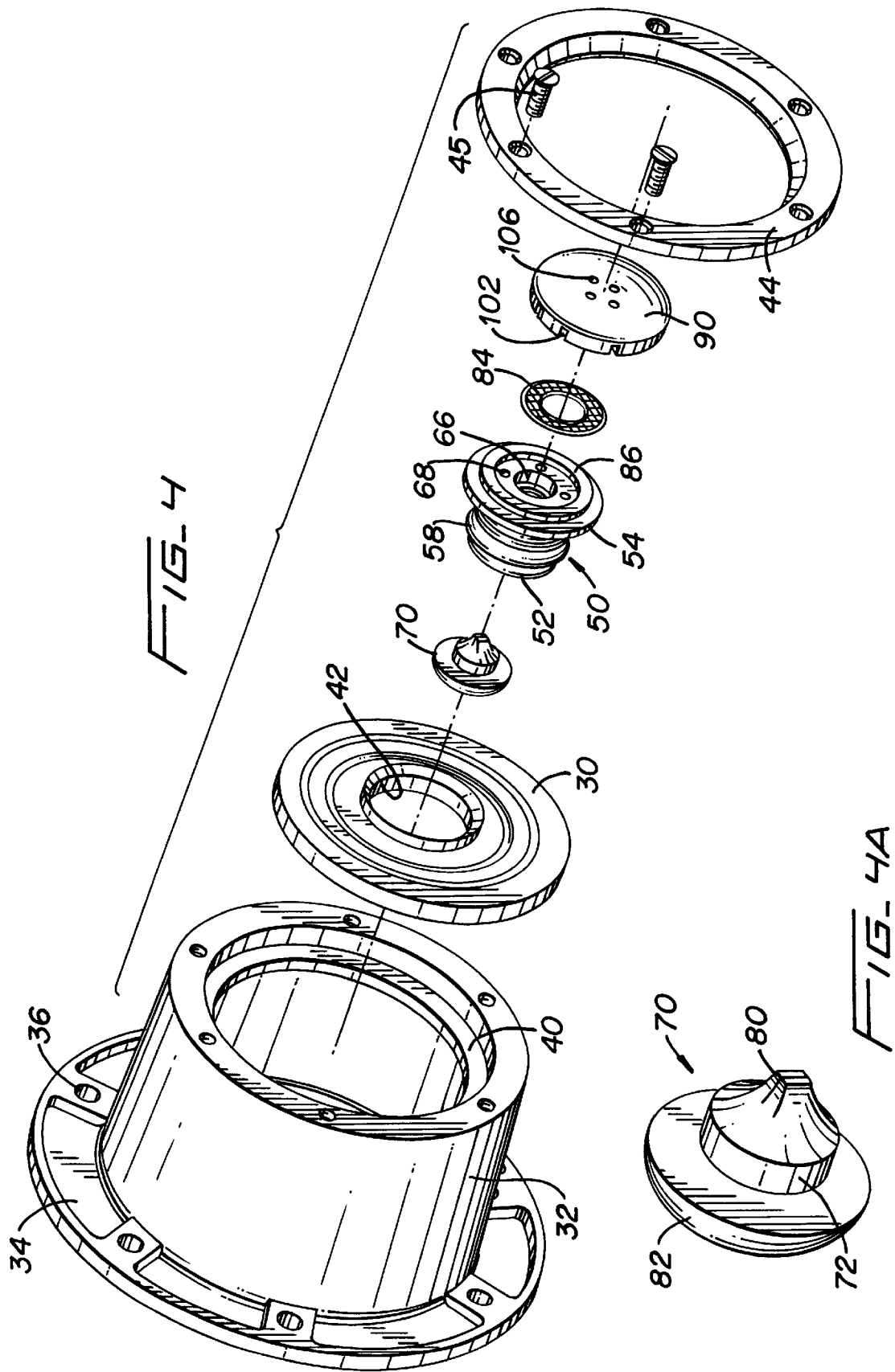

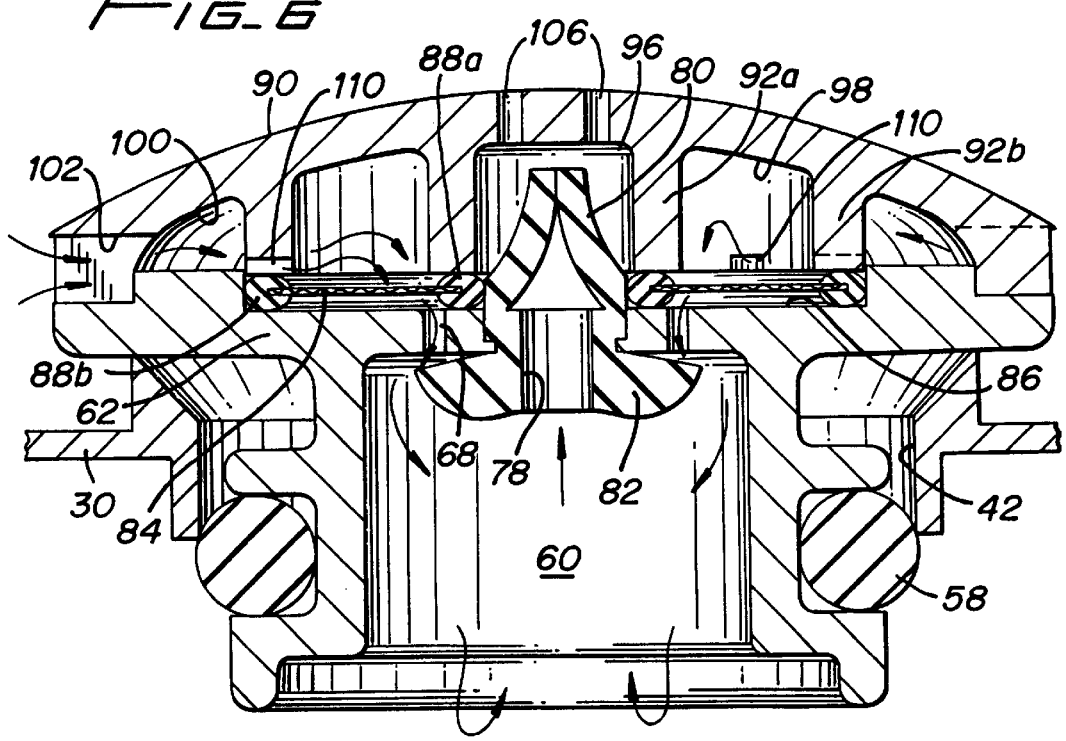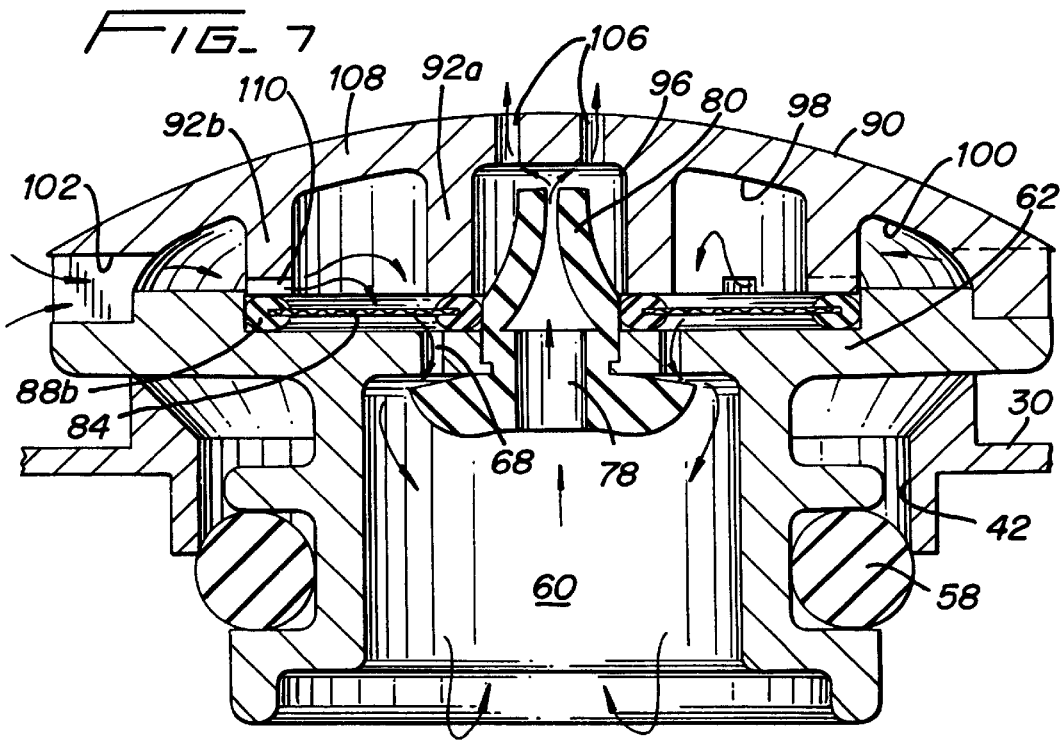

CONTAMINANT EXCLUDING HUBCAP VENT PLUG

BACKGROUND OF THE INVENTION

1. Field of the Invention

The subject invention relates to a vehicle hubcap, and more particularly, to a vented plug for use with a hubcap assembly installed on the wheel end of a heavy duty trailer or truck.

2. Background of the Related Art

In tractor and trailer wheel end axle assemblies, particularly those employed on large trailers and semi-trailers and tractors, the wheel is mounted on a fixed axle or spindle for rotation thereabout. The hub of the wheel defines a lubricant chamber about the end of the spindle in association with the wheel bearings. A quantity of lubricant is maintained in the lubricant chamber or wheel housing to continuously bath the bearings. A hubcap is used to enclose the lubricant chamber and, for maintenance purposes, the hubcap is oftentimes provided with a transparent end wall to readily observe the lubricant chamber.

Since the operation of a truck or trailer results in the heating of the fluid lubricant with the wheel housing, it has been found desirable to ventilate the wheel housing and provide for pressure equalization between the lubricant chamber and the surrounding atmosphere. It has also been found that water and foreign matter may be injurious to the wheel bearings. Therefore, provisions must be made to prevent such contaminates from entering the lubricant chamber by way of the ventilating features.

The subject invention provides a novel plug dimensioned and configured for reception in the end wall of a hubcap which includes features for ventilating the wheel housing while preventing the egress of fluid lubricants from the lubricant chamber and the ingress of water and foreign matter into the lubricant chamber.

SUMMARY OF THE INVENTION

The subject invention is directed to a vent plug for reception in a port formed in the endwall of a hubcap body. The hubcap body encloses a bearing chamber which is defined in the wheel end and which contains a fluid lubricant for continuously bathing the wheel bearings during vehicle operation. The vent plug includes a plug body having inlet vent structure for accommodating air flow into the bearing chamber during wheel end pressurization and outlet vent structure for accommodating gaseous flow out of the bearing chamber during wheel end depressurization. A first one-way check valve is operatively associated with the inlet vent structure and a second one-way check valve is operatively associated with the outlet vent structure. In a preferred embodiment of the subject invention, an annular seal member formed of a resilient compressible material is mounted in a gland extending about the periphery of the plug body for sealingly engaging the end wall of the hubcap when the plug body is received in the port.

Preferably, the plug body includes a plurality of inlet air passages each having an outboard end communicating with the surrounding atmosphere and an inboard end communicating with the bearing chamber. The outlet vent structure is defined by an axial bore which extends at least partially through the plug body and has an outboard end communicating with the surrounding atmosphere and an inboard end communicating with the bearing chamber. The first one-way check valve is defined by an umbrella valve and is movable between a normally closed position in which air flow into the bearing chamber is restricted and an open position in which air flow into the bearing chamber is permitted. The second one-way check valve is defined by a duckbill valve and is movable between a normally closed position in which the flow of wheel end gasses from the bearing chamber is restricted and an open position in which wheel end gasses are permitted to egress from the bearing chamber. In a preferred embodiment of the subject invention, the first one-way check valve and the second one-way check valve may be formed integral with one another.

The hubcap vent plug of the subject invention also includes filtering structure for excluding contaminants, particularly water, from passing through the inlet vent passages. The filtering structure is securably mounted within the interior the hubcap plug and preferably defined by a porous hydrophobic membrane configured to extend over the inlet air passages.

These and other features of the hubcap vent plug of the subject invention will become more readily apparent to those having ordinary skill in the art from the following detailed description of the invention taken in conjunction with the drawings.

BRIEF DESCRIPTION OF THE DRAWINGS

So that those having ordinary skill in the art to which the subject invention appertains will more readily understand how to make and use the hubcap vent plug of the subject invention, preferred embodiments of the sealing device will be described in detail hereinbelow with reference to the drawings wherein:

FIG. 1 is a perspective view of a trailer wheel employing a hubcap and vent plug constructed in accordance with a preferred embodiment of the subject invention;

FIG. 2 is a wheel and axle assembly illustrating the interior bearing chamber enclosed by a hubcap employing the vent plug of the subject invention;

FIG. 3 is a perspective view of a hubcap with the vent plug positioned in the endwall thereof;

FIG. 4 is an exploded perspective view of the hubcap and vent plug illustrated in FIG. 3;

FIG. 4A is an enlarged perspective view of the valving unit employed with the vented hubcap of the subject invention;

FIG. 5 is a cross-sectional view of the hubcap vent plug of the subject invention taken along line 5—5 of FIG. 3 illustrating the interior construction of the vent plug and the sealing engagement between the vent plug and the endwall of the hubcap;

FIG. 6 is a cross-sectional view of the hubcap vent plug of the subject invention taken along line 5—5 of FIG. 3 illustrating the one-way umbrella valve in an open position to permit air flow into the bearing chamber during wheel end pressurization; and FIG. 7 is a cross-sectional view of the hubcap vent plug taken along line 5—5 of FIG. 3 illustrating the one-way duckbill valve in an open position to permit gasses to egress from the bearing chamber during wheel end depressurization.

DETAILED DESCRIPTION OF THE PREFERRED EMBODIMENTS

Referring now in detail to the drawings wherein like reference numerals identify similar structural elements of the subject invention, there is illustrated in FIG. 1 a trailer wheel 10 including a wheel hub 12 and a tire 14. A hubcap 16 is employed on trailer wheel 10 and it includes a hubcap plug 20 constructed in accordance with a preferred embodiment of the subject invention As illustrated in FIG. 2, wheel hub 12 is mounted on the end of trailer axle 22 and is supported for rotation thereabout by inboard roller bearings 24 and outboard roller bearings 26 during vehicle operation. Wheel hub 12 defines an interior chamber 28 which contains a fluid lubricant that continuously baths the inboard and outboard roller bearings 24 and 26. Hubcap 16 is bolted to the end of wheel hub 12 to enclose interior chamber 28. As discussed in detail hereinbelow, the vented hubcap plug 20 of the subject invention is mounted in the endwall 30 of hubcap 16 and is readily removable to facilitate maintenance and inspection of the wheel hub, axle and bearings. Furthermore, hubcap plug 20 is particularly designed to facilitate venting of the wheel end chamber 28 and prevent contaminants and foreign matter from entering the chamber.

Referring now to FIGS. 3 and 4, hubcap 16 is defined by a generally cylindrical body 32 having an annular mounting flange 34 extending radially outwardly from the inboard end thereof. Mounting flange 34 includes a plurality of radially spaced apart, structurally reinforced, bolt holes 36 for receiving a corresponding number of bolts 38 (see FIG. 2) which secure the hubcap body 32 to the end of wheel hub 12. An annular recessed seat 40 is formed in the outboard end of hubcap body 32 for receiving and supporting endwall 30. Preferably, endwall 30 is defined by a transparent sight-glass or window which permits visual inspection of the bearing chamber 28, and a central port 42 is defined therein for receiving the hubcap plug 20 of the subject invention. An annular retention ring 44 is mounted to the hubcap body 32 by a plurality of threaded fasteners 45 to secure endwall 30 within the recessed seat 40.

Referring now to FIGS. 4 and 5, hubcap plug 20 includes a plug body 50 formed by an inboard portion 52 and an outboard portion 54. The inboard portion 52 is dimensioned and configured to extend through the central port 42 in endwall 30 and the outboard portion 54 is dimensioned and configured to reside adjacent the exterior surface of end wall 30. The inboard portion 52 of plug body 50 includes an annular gland 56 for receiving and retaining an elastomeric sealing ring 58. Sealing ring 58 is dimensioned to effect an interference fit between endwall 30 and plug body 50 when hubcap plug 20 is received in the central port 42 of endwall 30. The interference fit achieved by sealing ring 58 facilitates the ready removal of plug 20 from endwall 30 to perform maintenance or inspection of the wheel end.

An axial bore 60 is formed within the inboard portion 52 of plug body 50. The outboard end of axial bore 60 is delimited by the interior surface of the barrier wall 62 of the outboard portion 54 of plug body 50, and the inboard end 64 of axial bore 60 is enlarged and opens into the interior of hubcap body 32. A counterbored central aperture 66 extends through barrier wall 62 to define an outlet vent path and a plurality of radially spaced apart apertures 68 extend through annular wall 60 about the periphery of central aperture 66 to define a plurality of inlet vent paths.

An elastomeric valving member 70 is operatively associated with the outlet and inlet vent paths to control the flow of air and gasses therethrough during vehicle operation to facilitate wheel end pressurization and depressurization. Valving member 70 defines a main valve body 72 which extends through central aperture 66 and is securely retained therein by the interaction of valve body 72 and the inset 76 of the counterbore of aperture 66. A central bore 78 extends through the main valve body 72 to further define the outlet vent path of the plug body, and an inboard biased duckbill valve 80 depends from the main valve body 72 to control the flow of gasses through central bore 78 during wheel end depressurization. More particularly, duckbill valve 80 functions as a one-way check valve to permit the egress of pressurized wheel end gasses from the bearing chamber during vehicle operation, as will be discussed in greater detail hereinbelow with reference to FIG. 7.

A radially outwardly extending umbrella valve 82, biased in an outboard direction, depends from the inboard end of valve body 72 and is positioned in abutting contact with the interior surface of barrier wall 62 to control the flow of air through the radially spaced apart aperture 68 which define the inlet vent paths of hubcap plug 20 during wheel end pressurization. More particularly, umbrella valve 82 functions as a one-way check valve to permit the ingress of ventilation air into bearing chamber 20 during wheel end depressurization, as will be discussed in greater detail hereinbelow with reference to FIG. 6. Although the duckbill and umbrella valve portions of valving member 70 are described and illustrated as integral structures, those skilled in the art will readily appreciate that the two valving portions may be formed as separate structural componets without departing from the sprirt and scope of the subject invention.

An annular filtration member 84 is supported in a complementary seat 86 formed in the outer surface of barrier wall 62 and is dimensioned and configured to cover the apertures 68 defining the inlet vent paths. Filtration member 84 is defined by an annular hydrophobic membrane supported between a radially inner sealing ring 88a and a radially outer sealing ring 88b. The filtration membrane is preferably formed from expanded polytetafluoroethylene (PTFE) and is designed to prevent the entry of external environmental contaminants, primarily water, into the closed wheel end chamber 28 while allowing atmospheric gasses to pass into the wheel end during wheel end pressurization.

The filtration member 84 is secured within annular seat 86 by a crowned end cap 90 which is attached to the exterior surface of separator wall 62 by methods well known in the art, such as, for example, ultrasonic welding. More particularly, end cap 90 includes concentrically formed radially inner and radially outer interior annular wall structures 92a and 92b which compressibly engage sealing rings 88a and 88b of filtration member 84 to maintain the filtration member within annular seat 86. End cap 90 also serves to protect the inlet air paths from direct high pressure spray wash during scheduled vehicle cleaning by deflecting and reducing the force of the spray.

With continuing reference to FIG. 5, the interior of end cap 90 defines three concentric plenum chambers including an inner plenum chamber 96 which communicates with outlet vent path defined by duckbill valve 80, an intermediate plenum chamber 98 which communicates with the inlet vent paths defined by the radially disposed apertures 68, and an outer plenum chamber 100 which is in direct communication with the surrounding atmosphere through a plurality of radially spaced apart side slots 102 formed in the outer peripheral wall 104 of end cap 90. The inner plenum chamber 96 communicates with the surrounding atmosphere through a plurality of axially disposed exhaust ports 106 which extend through the domed end wall 108 of end cap 90.

The inner plenum chamber 96 is isolated from the intermediate plenum chamber 98 by radially inner annular wall structure 92a, and the intermediate plenum chamber 98 communicates with the outer plenum chamber 100 through a plurality of radially spaced apart slots 110 which extends through the radially outer annular wall structure 92b. During wheel rotation, side slots 102 serve the additional advantageous function of clearing water and debris that may accumulate in the plenum chambers of end cap 90.

As noted hereinabove, during vehicle operation, heat dissipated into bearing chamber 28 by the inboard and outboard roller bearings 24 and 26, as wheel hub 12 rotates about trailer axle 22 (See, FIG. 2), causes the gasses within bearing chamber 28 to become pressurized. Consequently, a pressure differential is established between the bearing chamber 28 and the surrounding atmosphere. In accordance with the subject invention, pressurization and depressurization of bearing chamber 28 is facilitated by the interchange of wheel end and atmospheric gasses through the venting mechanism of hubcap plug 20.

In particular, as illustrated in FIG. 6, during wheel end pressurization, atmospheric air is drawn into the outer circumferential plenum chamber 100 of end cap 90 through slots 102. The atmospheric air is then drawn into the intermediate plenum chamber 98 through the slots 110 in annular wall structure 92b. The inlet air flow then passes through filter member 84 and into the radially spaced apart apertures 68 in barrier wall 62. Thereupon, the inlet air pressure forces umbrella valve 82 to move from its normally closed position illustrated in FIG. 5, to the open position shown in FIG. 6, so as to permit the atmospheric air to flow into bearing chamber 28 to effect the pressurization thereof.

Once the gasses within bearing chamber 28 reach a sufficient pressure to effect movement of the duckbill valve 80 from the normally closed position illustrated in FIG. 5, to the open position shown in FIG. 7, the bearing chamber depressurizes. At such a time, chamber gasses pass through the central bore 78 of valve body 72 and into the inner plenum chamber 96 of end cap 90, whereupon the wheel end gasses are vented to the atmosphere through exhaust ports 106. As depicted in FIG. 7, as a consequence of wheel end depressurization, atmospheric air may be drawn into bearing chamber 28 through the inlet vent apertures 68 to equalize the pressure within bearing chamber 28.

Although the hubcap vent plug of the subject invention has been described with respect to a preferred embodiment, it is apparent that modifications and changes can be made thereto without departing from the spirit and scope of the invention as defined by the appended claims.

What is claimed is:

1. A hubcap assembly for enclosing a wheel end bearing chamber containing a fluid lubricant comprising:
   a) a hubcap body which encloses said bearing chamber and defines at least in part an end wall having a port extending therethrough; and
   b) a plug body dimensioned and configured for reception in said port, said plug body including:
      i) inlet vent means for accommodating air flow into said chamber during wheel end pressurization;
      ii) outlet vent means for accommodating gaseous flow out of said chamber during wheel end depressurization;
      iii) a first one-way check valve operatively associated with said inlet vent means to control air flow through said inlet vent means; and
      iv) a second one-way check valve operatively associated with said outlet vent means to control gaseous flow through said outlet vent means; and
      c) means mounted on said plug body for sealingly engaging said end wall when said plug body is received in said port.

2. A hubcap assembly as recited in claim 1, wherein said end wall comprises a transparent sight glass for viewing the interior of said chamber.

3. A hubcap assembly as recited in claim 1, wherein said inlet vent means comprises a plurality of inlet passages each having an exterior end communicating with the atmosphere and an interior end communicating with said chamber.

4. A hubcap assembly as recited in claim 3, wherein said outlet vent means comprises an axial bore extending through said plug body and having an exterior end communicating with the atmosphere and an interior end communicating with said chamber.

5. A hubcap assembly as recited in claim 4, wherein said first one-way check valve is defined by an umbrella valve and said second one-way check valve is defined by a duckbill valve.

6. A hubcap assembly as recited in claim 5, wherein said first one-way check valve and said second one-way check valve are formed integral with one another.

7. A hubcap assembly as recited in claim 1, further comprising filtering means for excluding contaminants from passing through said inlet vent means.

8. A hubcap assembly as recited in claim 7, wherein said filtering means comprises a porous hydrophobic membrane configured to extend over said inlet air passages.

9. A hubcap assembly as recited in claim 1, wherein said means for sealingly engaging said endwall comprises an annular seal member formed of a resilient compressible material, said seal member being disposed in a circumferential gland extending about the periphery of said plug body.

10. A plug for reception in a port formed in an end wall of a hubcap body which encloses a wheel end bearing chamber containing a fluid lubricant, said plug comprising:
   a) a plug body;
   b) inlet vent means formed in said plug body for accommodating air flow into said chamber during wheel end pressurization;
   c) outlet vent means formed in said plug body for accommodating gaseous flow out of said chamber during wheel end depressurization;
   d) a first one-way check valve operatively associated with said inlet vent means to control air flow through said inlet vent means;
   e) a second one way valve operatively associated with said outlet vent means to control gaseous flow through said outlet vent means; and
   f) means mounted on said plug body for sealingly engaging said end wall when said plug body is received in said port.

11. A plug as recited in claim 10, wherein said inlet vent means comprises a plurality of inlet air passages each having an exterior end communicating with the atmosphere and an interior end communicating with said chamber.

12. A plug as recited in claim 10, wherein said outlet vent means comprises an axial bore extending through said plug body and having an exterior end communicating with the atmosphere and an interior end communicating with said chamber.

13. A plug as recited in claim 10, wherein said first one-way check valve is defined by an umbrella valve and said second one-way check valve is defined by a duckbill valve.

14. A plug as recited in claim 13, wherein said first one-way valve and said second one-way valve are formed integral with one another.

15. A plug as recited in claim 10, further comprising filtering means for excluding contaminants from passing through said inlet vent means.

16. A plug as recited in claim 15, wherein said filtering means comprises a porous hydrophobic membrane configured to extend over said inlet air passages.

17. A plug as recited in claim 10, wherein said means for sealingly engaging said end wall comprises an annular sealing ring, said sealing ring being disposed in a circumferential gland extending about the periphery of said plug body.

18. A vented plug for reception in a port formed in a hubcap body which encloses a wheel end bearing chamber containing a fluid lubricant, said vented plug comprising:
   a) a plug body having a circumferential gland extending about an outer periphery thereof;
   b) a plurality of inlet vent passages formed in said plug body for accommodating air flow into said chamber during wheel end pressurization, each inlet vent passage having an outboard end communicating with the surrounding atmosphere and an inboard end communicating with said bearing chamber;
   c) an outlet vent passage formed in said plug body for accommodating gaseous flow out of said bearing chamber to the surrounding atmosphere during wheel end depressurization;
   d) a first one-way check valve adjacent the inboard ends of said inlet vent passages, said first one-way check valve being movable from a normally closed position in which air flow through said inlet vent passages is restricted to an open position in which air is permitted to flow through said inlet vent passages into said bearing chamber;
   e) a second one-way check valve operatively associated with said outlet vent, said second one-way check valve being movable from a normally closed position in which gaseous flow through said outlet vent passage is restricted to an open position in which gases are permitted to vent flow through said outlet vent passage from said bearing chamber;
   f) a porous sheet of hydrophobic filtering material configured to extend over the inboard ends of said inlet vent passages to exclude contaminants from passing through said inlet vent passages into said bearing chamber when said first one-way check valve is in said open position; and
   g) a resilient compressible sealing ring mounted in said gland of said plug body to sealingly engage a periphery of said reception port when said plug body is received therein.

19. A vented plug as recited in claim 18, wherein said first one-way check valve is defined by a umbrella valve and said second one-way check valve is defined by a duckbill valve.

20. A vented plug as recited in claim 18, wherein said first one-way check valve and said second one-way check valve are formed integral with one another.

* * * * *